M. G. HILPERT.
TRUCK CONSTRUCTION FOR TURNTABLES.
APPLICATION FILED MAY 1, 1918. RENEWED DEC. 19, 1919.
1,386,060.
Patented Aug. 2, 1921.
4 SHEETS—SHEET 1.
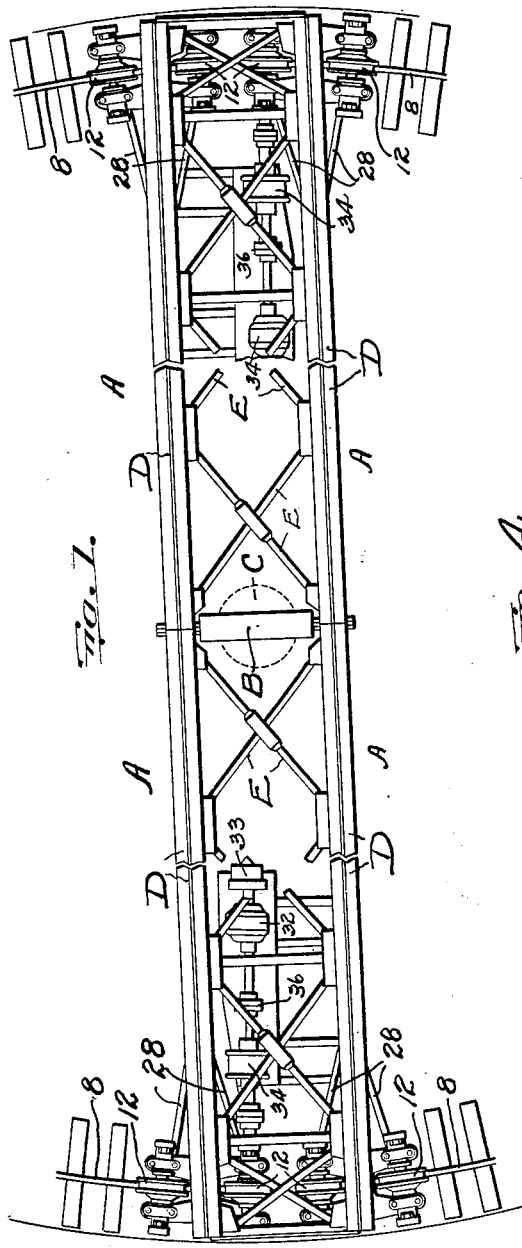
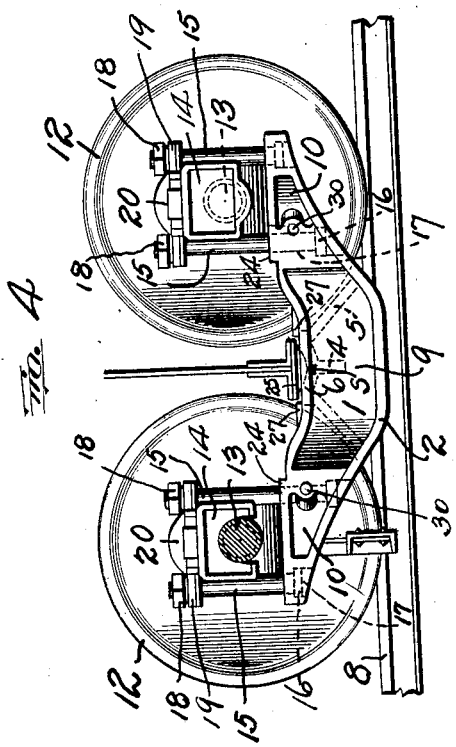
Inventor
MEIER GEO. HILPERT.
Witness
By
Attorney

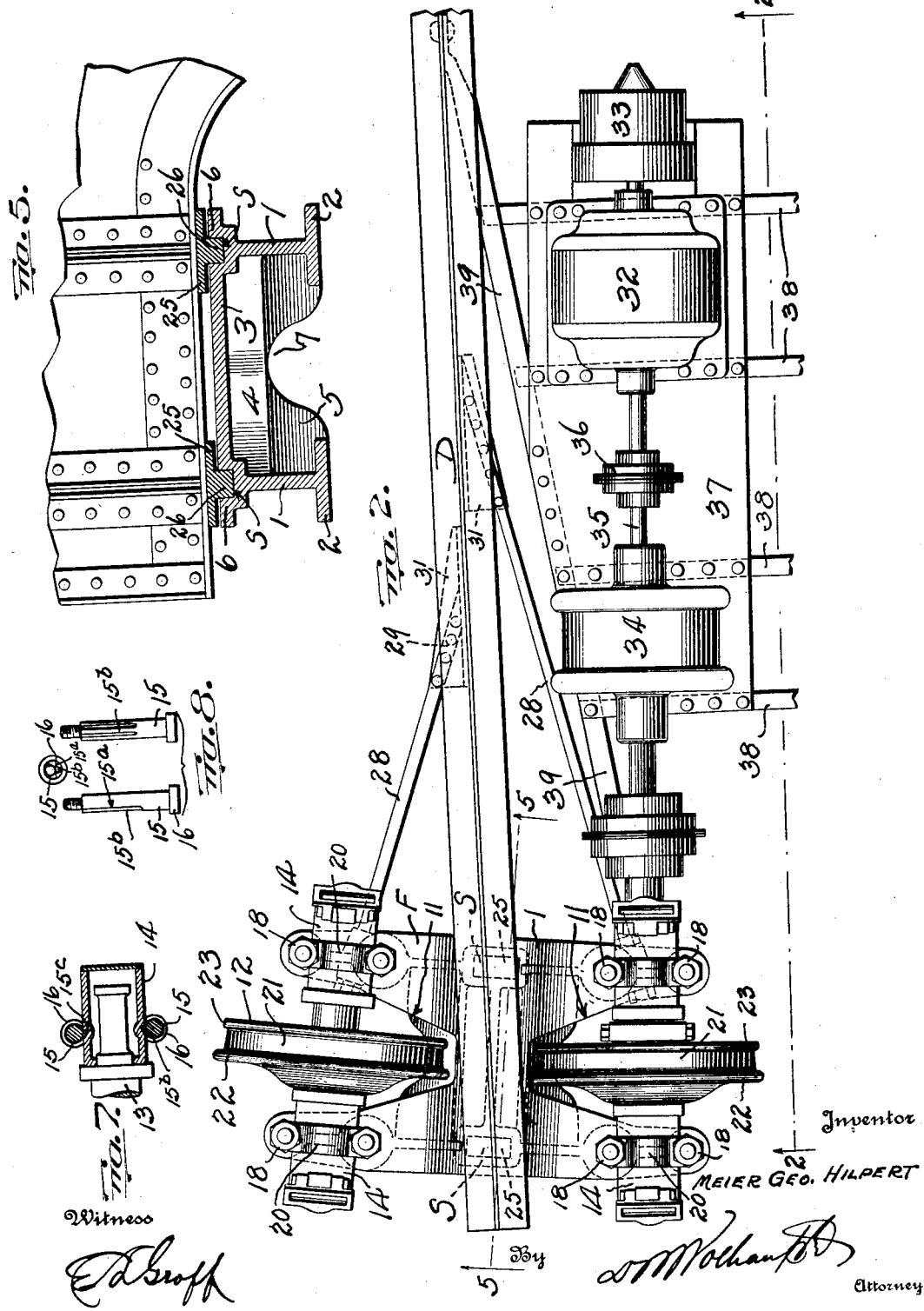

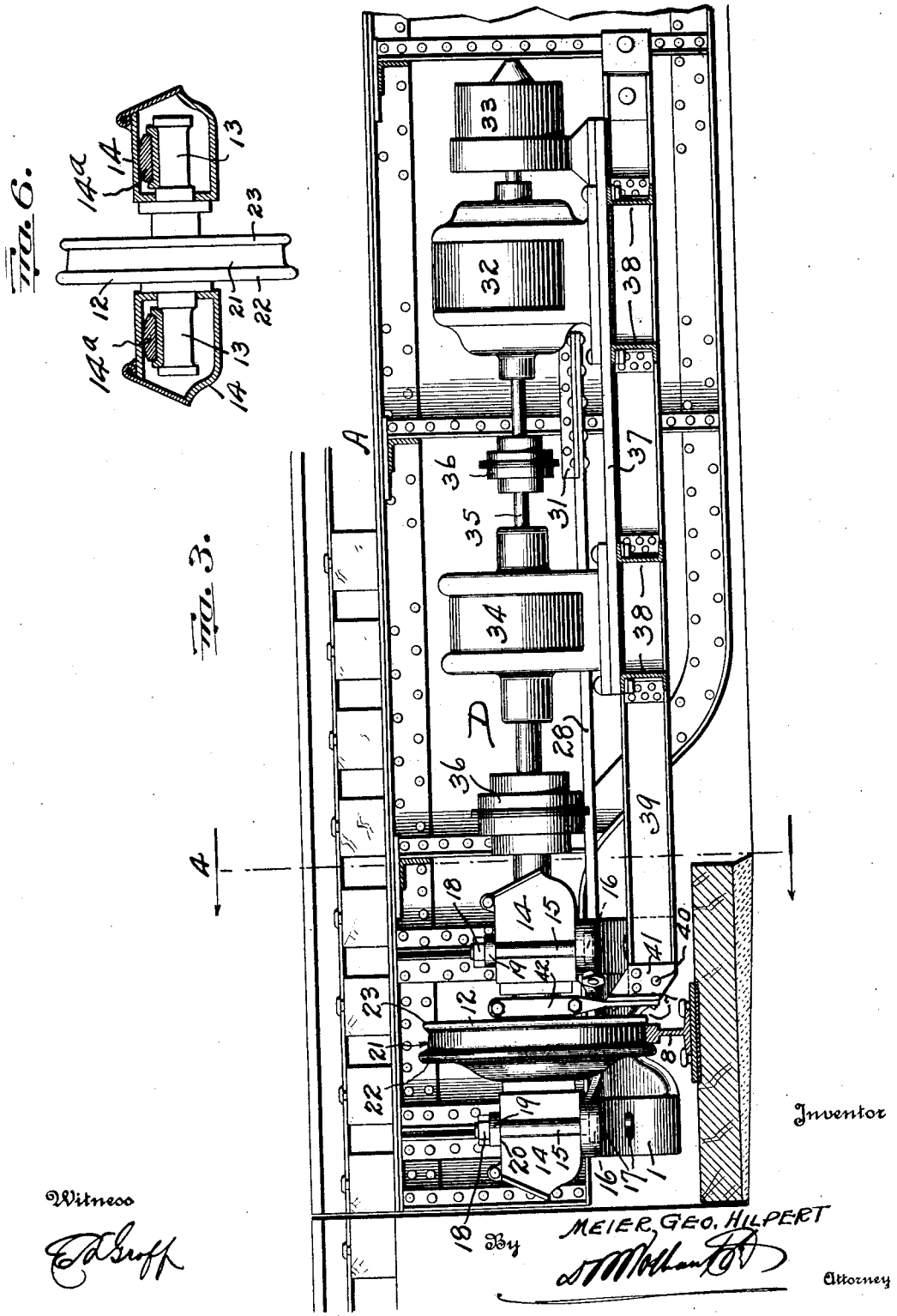

M. G. HILPERT.
TRUCK CONSTRUCTION FOR TURNTABLES.
APPLICATION FILED MAY 1, 1918. RENEWED DEC. 19, 1919.
1,386,060.
Patented Aug. 2, 1921.
4 SHEETS—SHEET 4.
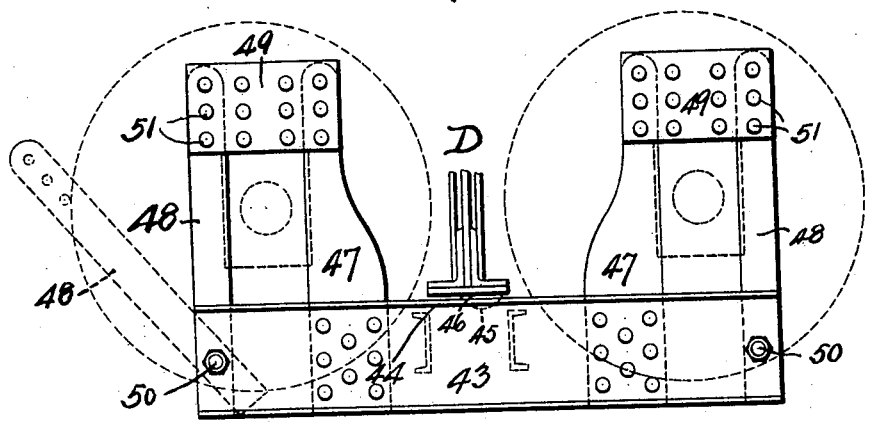
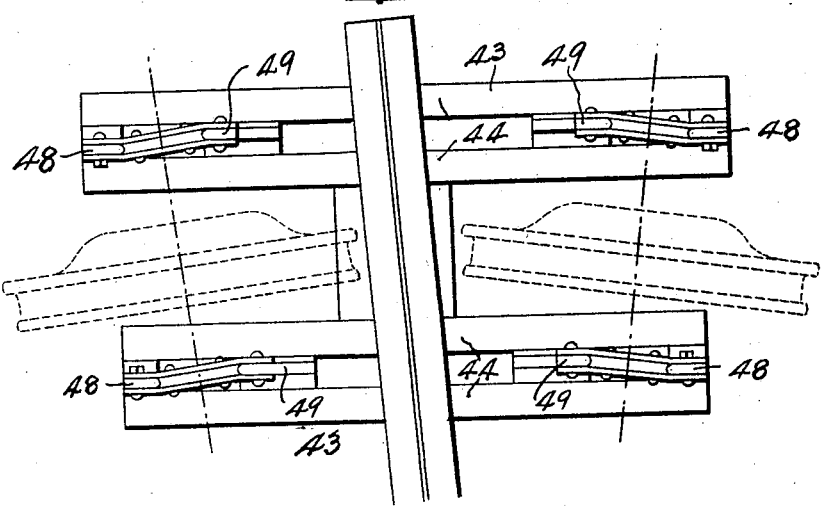
Inventor
MEIER GEO. HILPERT

UNITED STATES PATENT OFFICE.

MEIER GEO. HILPERT, OF HARRISBURG, PENNSYLVANIA, ASSIGNOR TO BETHLEHEM STEEL BRIDGE CORPORATION, OF BETHLEHEM, PENNSYLVANIA, A CORPORATION OF DELAWARE.

TRUCK CONSTRUCTION FOR TURNTABLES.

1,386,060.   Specification of Letters Patent.   Patented Aug. 2, 1921.

Application filed May 1, 1918, Serial No. 231,858. Renewed December 19, 1919. Serial No. 346,173.

*To all whom it may concern:*

Be it known that I, MEIER GEO. HILPERT, citizen of the United States, residing at Harrisburg, in the county of Dauphin and State of Pennsylvania, have invented certain new and useful Improvements in Truck Constructions for Turntables, of which the following is a specification.

This invention relates to the subject of railway turn-tables and particularly to a structure for that purpose embodying novel structural features possessing special utility in the construction of turn-tables for heavy loadings.

On account of the increasing weight of rolling stock, particularly engines, engineers are now required to seriously consider, from engineering, manufacturing and economical standpoints, the types of turn-tables that are best suited and adapted to meet present requirements and conditions. Among the types of turn-tables which have heretofore been more or less considered are the divided span type of turn-table, the single span type without center, and the continuous unbalanced beam type with the center. The present invention has been designed to provide a truck structure applicable to these various types of turn-tables and also equally applicable to the usual—balanced on center—type, thereby providing a truck structure universally available for supporting the outer or abutment ends of a turn-table span of any design.

A principal object of the present invention is to provide a turn-table truck construction responding to engineering and practical requirements both as to cost and efficiency. To that end the invention includes various correlated elements contributing to provide a structure having certain important functions or characteristics. That is to say, among the divers results accomplished by the present invention certain features are of prime importance. These features include means whereby the improved truck structure will principally have,—

1. A design possessing great stability by "underhanging," that is by applying the load on the truck below the wheel axles and on a special wide base, preferably a base having a two point load bearing.

2. A novel arrangement of parts whereby sensitive and perfect equalization of the load on the truck wheel-axles may be had by applying the load through small seats and saddles with an alinement tangential to the rail, and radial to the turn-table center, also by providing a long and well designed wheel base;

3. Means permitting an adjustment in the application of the load on the axles through the use of saddles on each bearing point for the load, and providing equalization on the bearings by the use of long wheel-axles;

4. A design admitting of the use of very large wheels to thereby minimize longitudinal-of-rail shocks and also including simple and improved means to avoid dislodgment of the truck;

5. A novel construction and arrangement of parts whereby an equalizing truck, as distinguished from a rigid or fixed truck, is of sufficient stability to allow applying the power direct to the truck instead of to the turn-table through a separate tractor, "mule" or other auxiliary power unit;

6. A construction whereby a single truck pattern may become applicable to any length turn-table without alterations or change in the structure and with the same amount of machining in all cases;

7. A girder structure in which maximum depth and strength is realized in underhanging the truck and dropping the girder beam on each side of the rail, and at the same time involving the desirable feature of requiring a turn-table pit of shallower depth than ordinarily, with a consequent saving of expense in installation;

8. An improved structural combination and arrangement of parts whereby the truck wheels are properly and effectually held to the rail heads, proper provision made for mounting the power plant for driving the truck therefrom, provision for quick repairs and facility in the shop operations and work incident to the manufacturing of the truck, and provision whereby certain parts of standard manufacture may be utilized with but slight changes, *i. e.* wheels, boxes, brasses and wedges.

Other practical objects attained by the present improvements will be more apparent in detail as the description proceeds and it will be understood that in carrying forward the invention to secure the various objects and advantages thereof the same is susceptible of a wide range of structural modification. However, for purposes of illustration certain preferred and practical embodiments of the invention are shown in the accompanying drawings, in which:—

Figure 1 is a general plan view of a turntable of the divided-span type equipped with four two-wheel truck units constructed in accordance with the present invention.

Fig. 2 is a top plan view of one of the truck units arranged to support the outer end of one girder of one of the span units, said truck unit having the improved features of the present invention.

Fig. 3 is a vertical transverse sectional view of the truck unit on the line 2—2 of Fig. 2, showing in elevation the adjacent portion of the span girder, span track for rolling stock, and abutment circular track.

Fig. 4 is an elevation of the truck unit on a line of section through the adjacent girder parts indicated by the line 4—4 on Fig. 3.

Fig. 5 is a detail transverse sectional view of the truck, indicated by the line 5—5 on Fig. 2.

Fig. 6 is a detail longitudinal sectional view of an axle and wheel of the truck, the line of section extending through the journal boxes, brasses and wedges.

Fig. 7 is a detail horizontal sectional view of the journal box illustrating the engagement and relation of the retaining shock and load members.

Fig. 8 is a side and front elevation and end view of the shock and load members.

Fig. 9 is a side elevation of a modified form of truck frame of the structural type that may be employed in carrying out the primary object of the present invention.

Fig. 10 is a top plan view of the form of construction shown in Fig. 9.

Like references designate corresponding parts throughout the several figures of the drawings.

As above indicated the improved truck construction is designed with special reference to its utility as a supporting unit for the abutment ends of the long span and divided-span types of turn-tables, although it is to be understood that the invention is not necessarily limited to any particular type of turntable but is capable of more general application to any turntable construction requiring an adequate support for receiving and distributing the engine and girder load at the outer end thereof whether stationary or revolving. However, by way of exemplifying the preferred use of the invention there is shown in Fig. 1 of the drawings a divided-span turntable primarily comprising the separate span sections A—A flexibly connected at their inner end portions as at B by means of a flexible joint or hinge of a suitable character and located adjacent or within the vertical plane of the center bearing C for the turntable. This type of turntable span supports the locomotive or rolling stock track in the usual way and each span section or member A of the divided-span preferably includes a pair of spaced parallel upright supporting girders D and the lateral bracing system E rigidly connecting and bracing the said girders, all in a manner that will be readily understood by engineers familiar with this class of structures. It will be observed that the supporting girders D—D of the turntable span are preferably of the I-beam shape, but as far as the invention of this application is concerned may be made in any suitable way though preferably built up structurally by web plates and angles to produce the usual web for the beam and the top and bottom flanges thereof.

According to the design proposed by the present invention each span girder D is supported at its outer traveling or abutment end by a two wheel truck unit, and there being one of said units under the outer end of each girder it will be observed that the outer end of each span section is supported and carried upon two truck units of the same design, and embodying the same features of construction to provide for evenly distributing and sustaining the load of both girders, thus rendering it entirely practical and feasible to utilize (if specified) a divided span type of turntable with the flexible joint at or adjacent the center thereof.

Referring now more particularly to the detail construction and arrangement of parts embodied in each two-wheel truck unit it will be observed by reference especially to Figs. 2, 4, and 5 of the drawings, that the truck primarily includes a truck frame designated generally by the reference letter F. This truck frame embodies in its construction a main casting having opposite parallel side girder members 1—1 preferably reinforced at their bottom edges by the stiffening flanges 2 and integrated at their upper edges with a top platform or diaphragming member 3 which becomes a rigid part of the girder portions of the frame. In addition to the side girder members 1 and the top platform 3, the truck frame is preferably formed with the vertical and diagonally disposed stiffening webs 4 and 5 respectively, which are disposed beneath the platform member 3 and are so arranged with reference to the central part of the platform as to effectually stiffen and reinforce those particular points which are intended to receive and to seat the span girder and receive and distribute the load therefrom. This stiffening and bracing of the central loading base or bases 6 of the platform is best seen in Figs. 4 and 5 of the drawings and in connection with the diagonally arranged stiffening webs 5 which converge upwardly to the platform or diaphragm 3 it will be observed that the bottom edges of the said diagonal webs are formed with upwardly extending rail notches 7 which preferably extend well clear of the circular track rail 8 within the turntable pit, but which permit the truck frame to be dropped to a resting position on the track rail for removal of frames from under the girder, or when the wheels and wheel parts are removed for the purposes of repair or replacement. It will also be noted that this particular construction permits of the use of relatively deep side girders 1 for the truck frame thus conserving the depth of the truck frame and also of the span girder while at the same time facilitating the ready removal and replacement of parts as above referred to.

As clearly shown in Fig. 4 of the drawings the side girders 1 of the truck frame F are relatively deep at the central part of the truck within the vertical plane of the loading base 6 upon which is seated the span girder D, said central deep section of the side girder members being designated by the numeral 9 in Fig. 4 of the drawings, and toward both ends the said side girder members of the truck frame are of a tapering formation so as to stand well above the track rail 8 and to form in connection with the end portions of the top platform member 3 the terminal bearing supporting arms 10 upon which are superimposed the terminal mountings for the axles of the truck wheels. It will also be observed in connection with the tapering ends of the girder member 1 to produce the bearing supporting arms 10 that the top platform 3 is formed with deep reëntrant wheel clearance notches 11 which admit of the use of standard sizes of wheels 12, such as standard car wheels as the wheel members of the truck, while at the same time providing a very compact and strong truck construction which brings the wheel centers relatively close to the leading member 6 on which the span girder D is seated.

One of the distinctive and practical objects of the present invention is to provide a construction admitting of the use of standard replaceable car wheels, journal boxes, brasses and wedges, and therefore the arrangement of these parts with reference to the side girder members 1 and the top platform 3 is a desirable and advantageous feature of the invention. In this connection it will be observed that the large diameter supporting wheels 12 for the truck are carried upon wheel axles 13 journaled in bearing or journal boxes 14 of the conventional standard design and having the usual brasses and wedges. It will be observed that this structure presents widely spaced journals at both ends, each bearing having a central cap 14ª to distribute the journal load evenly over the length of the bearing.

The journal boxes 14 are seated on top of the terminal supporting arms 10 of the truck frame and are removably held in such position against movement longitudinally or transversely by means of separable journal box holders. In the design shown in Figs. 2, 3 and 4 these journal box holders essentially consist of upright tie bolts and shock elements 15 having their headed ends 16 seated within the bolt openings 17 formed in the supporting arms 10. Preferably each journal box is arranged between a pair of the retaining shock and load elements 15, and each of these elements which is primarily a tie bolt is milled on the side facing the journal box with a flat surface 15ª to bear against and fix the box, and also with a half round or equivalent locking rib 15ᵇ which fits and interlocks with a complemental standard groove 15ᶜ which is preferably formed in the side of the journal box engaged by the tie bolt which also serves the function of a shock and load member. It will also be observed from the drawings that the upper ends of the elements 15 are formed with eccentrically disposed threaded terminals 15ᵈ adapted to receive the fastening nuts 18 which engage the end portions 19 of the cap pieces 20 removably fitted over said threaded terminals 15ᵇ and extending across the top of the journal box. These bolts therefore not only have an interlocking engagement with the journal boxes to prevent endwise displacement thereof from longitudinal thrusts of the wheel axles, but also have the function of taking the shear and shock as well as to place the load on the boxes, this function being especially true with reference to the tie bolts nearest the span girder.

It will be clear that the described construction of journal box holders admits of convenient and ready taking down and setting up. That is to say, by removing the nuts 18 so as to free the cap pieces 20 the bolts may be allowed to drop with the result that the entire truck frame can be let down to a position resting on the track rail as already referred to, thus entirely unseating and freeing the journal boxes and wheels so that any of these parts can be readily removed and replaced without raising the loaded span girders and without disadvantage or inconvenience. Also as will be apparent the various parts of the journal box mountings are readily accessible for these purposes, thus obviating a serious objection which is inherent in present heavy turntable truck constructions which are more or less inaccessible and most difficult to repair and replace. A detail of practical importance in connection with the mounting and support of the journal boxes 14 is the provision on the platform 3 immediately under the journal box of a narrow and slightly raised portion 24 extending between and including the area of the shock bolts 15. This part when planed horizontally forms a machined seat for the box and a surface for laying out the shock bolt holes 17 at whatever angle of axles the length of the span demands. This detail together with a slight excess of metal around the shock bolts 15 allows of shifting their positions slightly within the range of axle wheels, thereby permitting the use of one truck casting pattern. Furthermore, particular attention is drawn to the feature of having all of the shock bolts of a special and heavy design so that they will have the capacity to effectually take the shock applied horizontally by the wheels through the axles. And, the bolts nearest the locking base or bases 6 will have an especially deep seat in the member 10 so as to fully develop the function of the bolt as a shock member, and it is preferable and desirable that the faces of the shock bolts should be properly machined so as to present the flat bearing face 15ª for engagement against the box side.

While it is desirable and advantageous to employ standard car wheels for the truck wheels 12 of the present invention it is desirable to slightly modify the tread portions 21 of the wheels so as to produce a relatively deep and substantial outside flange 22 and a relatively small and shallow inside flange 23, the said flanges being respectively disposed at the outer and inner sides of the rail head and maintaining an interlock between the wheels and the rail. In order to maintain the proper traction the said treads 21 of the truck wheels are beveled on a line which is radial to the center of the turntable span and this is true with respect to all of the truck wheels, thus insuring true rolling and traction thereof on the track rail.

Another important feature of the invention resides in the means for seating the span girder D on the loading base or bases 6 of the truck frame. At this point it will be observed that the term "loading base" refers and applies to that part of the truck to which the load is directly applied from the span girder, and according to the preferred embodiment illustrated in Fig. 5 of the drawings it will be noted that each loading base 6 is disposed directly over a girder or beam 1, of the truck frame, while the platform 3 between the said beams or girders operates as a tie or diaphragming member. And it will be understood that it is not the purpose of the present invention to limit the same to the use of a particular number of loading bases as a single loading point could be made available without departing from the principles of construction contemplated by the invention.

The means for seating the span girder D on the loading base include the provision of spaced rounded bearing seats S directly over side members 1 of the truck frame in the loading base 6 thereof. The said bearing seats S while arranged at opposite locations at or near the sides of the truck frame are intersected by a vertical plane radial to the turntable center and oblique to the vertical plane of the span girder arranged thereover. And, according to the present invention the girder has suitably fitted to the lower side thereof, over the truck frame a pair of spaced supporting saddle blocks 25 having downwardly convexed bearing projections 26 adapted to have a registering rocking fit within the bearing seats S provided therefor. The body or plate portion of each saddle block 25 has a substantial clearance from the top surface of the loading member 6 of the truck frame so as to admit of the relative vertical rocking or flexing of the truck to accommodate itself to wave motion of the track or the vertical vibrations, but since the bearing seats S and the bearing projections 26 of the saddle block are of oblong formation and are disposed longitudinally of the truck frame, the truck and span girder are prevented from relative displacement in a direction longitudinally of the span girder D. And, relative displacement of the truck and girder transversely of the latter is prevented by guard projections or shoulders 27 formed on the loading platform 6 immediately adjacent the ends of the oblong seats. These features of construction are all of practical importance from an engineering standpoint since the saddles and saddle seats are disposed at widely separate points on the truck frame thereby giving great transverse stability to the truck and as the bearing projections 26 are convexed downwardly, the depth of the truck frame and of the girder are conserved as well as convenient provision made for retaining lubricant under and about the saddle blocks. Furthermore, it will be observed that the saddles and saddle seats are placed on lines radial to the center of the divided span and will operate to exactly equalize the load on the two wheels, the axles of which are also radial to the span.

As a complement of the saddle mounting for the girder D on the loading member 6 whereby the truck is permitted relative rocking movement or flexing it is desirable to associate with the truck frame, upon opposite sides of the girder D the relative long stay rods 28. The inner ends of these stay rods are bolted as at 29 to tie pieces 30 provided on and in the tapered end portions of the side girder members 1 of the truck frame. From their points of bolted connection with opposite end portions of the truck frame the stay rods 28 extend diagonally respectively to opposite sides of the web of the span girder D and are fastened to the latter by holding plates 31 or equivalent connections. By reason of the length of these stay rods 28 between their fastened end portions 29—31 the same will readily adapt themselves to the vertical flexing or rocking of the truck while at the same time rigidly tying the truck to the span girder D in the position which maintains the wheel axles, the wheel treads and the load supporting saddles radial to the center of the turntable span.

The present invention also preferably contemplates utilizing one of the truck wheels in either of the flexible two-wheeled trucks at each end of the turntable as traction elements proper. This may be accomplished by either applying the power axially to the wheel axle and partially suspending the power plant from the truck frame so as to be coördinated with the flexibility of the truck, or by supporting the power unit on a truck extension. In either case provision is made between the face of the wheel and the adjacent bearing for either the partial support of the power unit or the application of a gear of the power unit in this location, thus better equalizing the power effect on the two bearings of the truck wheel axle, this being desirable in the case of flexible trucks. To illustrate the foregoing a practical way of applying the power to the traction wheel is clearly shown in Figs. 2 and 3 of the drawings. In this illustration the power unit or plant may include a driving motor 32 adapted to be driven from a source of electric energy suitably wired thereto, a brake 33 adjacent the motor, a speed reducer 34 and axially alined shafting 35 connected up by suitable flexible shafting couplings 36 to provide a single line of shafting for these various members which is connected with an extension of one of the wheel axles 13, thus providing means for a direct drive of the wheel 12 carried by that axle. The various elements referred to of the said motor plant are of any usual or conventional design and form no part of the present invention except so far as constituting a motor plant for driving one of the wheels of the truck to propel the turntable upon its center bearing. This motor plant is mounted upon a supporting platform 37 adapted to be carried by transversely arranged beams 38 which are in turn partly supported from and by a load distributing girder 39. This load distributing girder is designed to place a part of the load of the motor plant directly on the truck through one of the axles thereof and for that purpose is rigidly connected at its outer end as at 40 to a plate carried at the lower end of a hanger 41 suspended by means of a clamp or clevis 42 from the axle 13 of the driven traction wheel 12. The opposite or inner end portion of the load distributing girder 39 is pivotally connected with the span girder D supported on the loading member 6 of the truck, thereby completing a construction which provides for the support of the motor or power plant inside of the turntable span, and that in such a manner the load thereof is so distributed between the truck and the span girders as to insure a maximum power efficiency in propelling the truck over the track within the turntable pit. In this connection it will be seen that part of the span girder adjacent to which such plant is located is very deep and strong, extending well toward the bottom of the pit below the track rail 8 while the adjacent end portion of the girder is of a shallower depth so as to overlie the loading member of the truck platform as best seen from Fig. 3 of the drawings.

By way of illustrating the range of modification that may be resorted to in carrying forward the invention there is shown in Figs. 9 and 10 a modified construction of truck frame. This modified construction is of a structural formation, that is, built up of metal plates, angles or beams but including the primary essentials of the truck frame already described. That is to say, the modified form of truck illustrated in Figs. 9 and 10 include the side members 43 having reinforced central loading members 44 having rounded bearing seats 45 for the saddle blocks 46 on which the span girder D is mounted. In addition to these elements the said modified truck frame is provided at its end portions with the upstanding journal box holders comprising the inner and outer side bars 47 and 48 connected at their upper ends by the connecting plate 49 and the outer of which side bars 48 is pivotally mounted at its lower end on the pivot bolt 50 so that by removing the upper retaining bolts 51 from said bar, the latter may be swung outwardly and downwardly as indicated by the dotted line position in Fig. 9 with the result of directly releasing the journal box mounting for the wheel axle. In this construction the side bars 47 particularly, act as shock members. And by placing wedges of varying thickness on the sides of side bars 47 and 48 next to the journal boxes, axles may be set at different angles according to requirements.

From the modifications shown it is obvious that other modifications are possible by combinations of the structural shock members and journal box holders with a cast truck frame or by the combination of turned and milled shock members with a structural truck frame, without in any way departing from the principle of the invention with reference to these features thereof, and with further reference to possible modifications within the scope of the invention it will be evident that although the improvements have been described in connection with single wheels on each of the wheel axles it will be obvious that with some turntable constructions it may be desirable to utilize a pair of wheels on the same axle side by side with two corresponding track rails therefor, but as this would involve only an obvious multiplication of the wheels it will be clear that no change would be required in any of the essential parts or features of the invention to utilize a pair of wheels instead of a single wheel shown, and it will also be understood that other changes and modifications may be resorted to without departing from the spirit or sacrificing any of the advantages of the present invention.

I claim:

1. An equalizing two-wheel truck for turntables underhung from the wheel axles and having a movable bearing engagement with a girder of the turntable span.

2. An equalizing truck construction for turntables including a wheeled frame having a loading base disposed below the planes of the axles and adapted to adjustably support a girder of the turntable span.

3. An equalizing truck construction for turntables including a wheeled frame underhung from the wheel axles and provided with a loading base disposed below the planes of the axles and adapted to adjustably support a girder of the turntable span.

4. An equalizing truck construction for turntables including a wheeled frame having an underhung girder provided with a loading base disposed at the top of the girder for adjustably supporting a girder of the turntable span.

5. An equalizing truck construction for turntables including a wheeled frame having an underhung girder provided at the top thereof with a centrally located loading base adapted to adjustably support a girder of the turntable span.

6. An equalizing two wheel turntable truck having a two point loading part located on the median line between the wheel axles and adapted to adjustably support a girder of the turntable span.

7. An equalizing two-wheel turntable truck having an underhung girder including a central part provided with widely separate loading points located in the median line between the wheel axles.

8. A truck construction for turntables including a wheeled frame having a loading base disposed below the plane of the axles, and a girder supporting saddle loosely interlocked with said base.

9. A truck construction for turntables including a wheeled frame having a loading base, the span girder, and a saddle adjustably supporting the girder and having a direct loose bearing engagement with said loading base.

10. A truck construction for turntables including a wheeled frame having a centrally located loading base, and a girder adjustably supporting saddle having a loose interlocking bearing engagement directly upon said loading member.

11. An equalizing two-wheel turntable truck having a central part provided with two widely separated loading points located in the medial portion of said truck and girder supporting saddles having an adjustable load distributing bearing engagement on the truck at said points.

12. A truck construction for turntables including a wheeled truck frame having a centrally located loading base, between the axles, the span girder, and a plurality of girder supporting saddles having a bearing engagement with said loading member at spaced points.

13. A truck construction for turntables including a wheeled frame having a loading base provided with spaced longitudinally disposed saddle bearings, and girder supporting saddles loosely engaging in said bearings.

14. A truck construction for turntables including a wheeled frame having a loading base provided with spaced longitudinally disposed saddle bearings, and girder supporting saddles loosely interlocked within said bearings.

15. A truck construction including a wheeled frame having a central loading base disposed between the axle locations, and provided with oppositely arranged longitudinally extending bearing seats, and separate supporting saddles having loose interlocking engagement within said seats.

16. A truck construction including a wheeled frame having a loading base provided with spaced rounded bearing seats adjacent opposite sides thereof, and convexed girder supporting saddles loosely engaging said seats.

17. A truck construction including a wheeled frame having a loading base provided with spaced downwardly convexed bearings, and downwardly convexed girder supporting saddles loosely interlocking within said bearings.

18. A truck construction for turntable spans including a wheeled frame having spaced loading points for the span girder intersected by a vertical plane radial to the center of the turntable span.

19. A truck construction for turntable spans including a wheeled frame having a loading base provided with a saddle bearing disposed tangential to the turntable track.

20. A truck construction for turntable spans having a two point saddle bearing intersected by a vertical plane lying radial to the center of the turntable span.

21. A truck construction for turntable spans including a wheeled frame having a loading base provided with spaced bearings, and girder supporting saddles loosely engaging said bearings, said saddles and saddle bearings being arranged within a plane radial to the center of the span.

22. A truck construction for turntable spans including a wheeled frame having a loading base provided with spaced bearings, and girder supporting saddles loosely engaging said bearings, said saddles and saddle bearings being alined within a plane radial to the pivot center of the span, and also being intersected by the vertical plane of the girder supported thereby.

23. A truck construction for turntables with underhung frame including a reinforced loading base, and self-adjusting girder supporting saddle blocks on said loading base.

24. A truck construction for turntables with underhung frame including a loading base, and stiffening webs formed beneath said loading base.

25. A truck construction for turntables including a loading base, vertical and diagonal stiffening webs beneath the loading base, and girder supporting means on said loading base.

26. A truck construction for turntables including a loading base, stiffening webs beneath the loading base provided with rail clearance notches, and girder supporting means on said loading member.

27. A truck construction for turntables including a wheeled frame having spaced girders, a loading base at the top of each girder and stiffening webs connecting the girders below said loading bases.

28. A turn-table truck having widely spaced axle journals at both ends, and a relatively broad bearing center located on the median line between said journals for the loaded girder.

29. In an equalizing turntable truck, the truck frame carrying relatively large wheels and lateral tie members connected with the truck frame and flexibly connected to the rigid span.

30. A truck construction for turntables including in combination the frame, the wheel axles, journal boxes arranged at the end corners of and above said frame, and combined retaining and shock resisting tie bolts mounted on the frame respectively at opposite sides of each journal box and having an interlocking engagement therewith.

31. A truck construction for turntables including a frame having terminal journal box supporting seats, journal boxes arranged on said seats, the wheel axles, upstanding shock members arranged at the sides of the journal boxes and clamping the boxes on said seats, and load supporting means arranged on the frame between the axles.

32. A truck construction for turntables including a frame having side girder members provided with intermediate deep-girder portions, projecting below the rail and tapered terminal portions, journal box mounting fitted to said terminal portions and girder supporting means arranged on the frame between the said mountings.

33. A truck construction for turntables including a frame having supporting arms projecting above the plane of the bearing surface of the frame, journal box holders carried by said arms and adapted to detachably hold standard journal box equipment, the wheeled axles, and load supporting means arranged on the frame at the median point between the axles.

34. A turn table truck including the frame, the wheel axles, journal boxes for the axles and devices coöperating with said journal boxes for rigidly securing the boxes to the frame at different angles.

35. A turn table truck including the frame, the wheel axles, journal boxes for the axles and devices coöperating with said journal boxes permitting the same to be held at different angles, said means also co-acting with the journal boxes to prevent transverse or longitudinal displacement thereof.

36. A turntable truck having its frame disposed below the turntable girder and provided with spaced loading bases both located in the median line between the wheel bearings and disposed at opposite sides of the track rail.

37. A truck construction for turntables including a frame having supporting arms, journal box holders arranged to project above said supporting arms, the axles carrying wheels whose treads are beveled at angles radial to the pivot center of the turntable span, and load supporting means arranged on the frame between the axles.

38. A truck construction for turntables including a frame having terminal supporting arms and bottom reinforcing elements adapted to constitute temporary supports when the frame is dropped onto the rail, separable journal box holders arranged on top of the supporting arms, to permit the frame to be dropped away from the axle mountings, and the wheeled axles.

39. A turntable truck having a top loading base and separable wheel axle mountings upon opposite sides of said base to admit of slidably disengaging the truck from the girder.

40. A turntable truck comprising an integral frame having a loading base located at the median line of said truck and detachable wheel axle mountings arranged on opposite sides of said loading base.

41. A truck construction for turntables including a wheeled frame having a loading member provided with spaced bearing seats and guard projections or shoulders located adjacent the ends of said seats, and girder supporting saddles mounted on said seats.

42. An equalizing turntable truck including a wheeled frame having a girder bearing, a power unit platform partly supported by said wheeled frame and a power unit mounted on said platform.

43. An equalizing turntable truck including in combination with the span girder and a wheeled frame having a bearing for the span girder, of a power unit platform partly supported by said span girder and by the wheeled frame, and a power unit arranged on said platform.

44. A turntable truck having widely spaced axle journals at both ends, each bearing having an equalizing central bearing cap to distribute the journal load evenly over the length of the bearing.

45. In a turntable, the combination with the span girder and supporting device, of a bearing saddle interposed between said parts comprising a plate having a convexly curved projection on one face.

46. In a turntable, the combination with a span girder and supporting device, of a bearing saddle interposed between said parts comprising a member having a flat face and an opposite face convexly curved relative to the first face, said curved face constituting a bearing surface and the flat face a span supporting surface.

47. In a turntable, the combination with the span girder and supporting device, of a bearing saddle interposed between said parts comprising a plate having a rib projecting from one face, the face of said rib opposite the plate being convexly curved.

48. In a turntable, the combination with the span girder and supporting device, of a bearing saddle interposed between said parts comprising a plate having a rib projecting from one face, the face of said rib opposite the plate being convexly curved, and its sides being substantially perpendicular to said plate.

49. In a turntable, the combination with the span girder and supporting device, of a saddle interposed between said parts having a flat face directed toward one of the parts and a curved face directed toward the other whereby the device may oscillate relative to the girder.

50. In a turntable, the combination with the span girder and supporting device, of means to support the girder on the device for flexure including a member associated with one of said parts having a convex bearing surface, the other part being provided with a complemental bearing surface.

51. In a turntable, the combination with the span girder and supporting device, of a saddle associated with one of said parts, the other of said parts and saddle being formed the one with a convex projection and the other with a concave recess to receive said projection whereby the device may oscillate relative to the stand.

52. In a turntable, the combination with the span girders and trucks supporting said girders with a pivotal connection, of a machinery platform, means to support said platform including an attachment to one of the trucks, a motor on said platform and power transmitting means connecting the motor and a wheel of the last mentioned truck whereby said wheel may be rotated and the table turned about its center.

53. In a turntable, the combination with the span girders and the trucks supporting the same with a pivotal connection, of a platform, means for supporting said platform including a connection to an axle of a truck, a motor on said platform, and driving means connecting said motor and the wheel on said axle.

54. In a divided span turntable, the combination with the span girders and the equalizing trucks supporting the same, of a machinery platform at each end of the turn table, means for supporting each platform including a connection to an axle of a truck, a motor on each platform, and driving means connecting each motor to the wheel on the said axle.

55. A truck construction for turntables comprising a frame, axles having bearings, a journal box surrounding each bearing, clamp members extending across the top of the boxes, and a bolt at each side of each box clamping the box between said member and frame, said bolts and the adjacent sides of the boxes being formed the one with a longitudinal rib and the other with a slot in which the rib is fitted.

56. A truck construction for turntables comprising a frame, axles having bearings, a journal box surrounding each bearing, clamp members extending across the top of the boxes, and a bolt at each side of each box clamping the box between said member and frame, said bolts and the adjacent sides of the box being formed the one with a longitudinal rib and the other with a slot in which the rib is fitted, each bolt on each side of the rib or groove having a flat surface bearing against the side of the box.

57. A truck construction for turntables comprising a frame, axles having bearings, journal boxes surrounding the bearings, a member extending across the top of each box and a bolt at each side of the boxes clamping the box between said member and frame, the bolts each formed with a flat surface having a longitudinal rib and the box on each side formed with a groove in which one of said ribs is fitted, said flat surfaces bearing against the sides of the box.

58. A truck construction for turntables comprising a frame having a pair of flat seats, an axle having a pair of bearings, a journal box surrounding each bearing and bolts interlocked with the sides of the boxes securing each box to the frame on one of said seats.

59. A truck construction for turntables comprising a frame having a pair of flat seats, an axle having a pair of bearings, a journal box surrounding each bearing and bolts projecting from said seats on opposite sides of the boxes securing each box to the frame on one of said seats.

In testimony whereof I hereunto affix my signature in the presence of a witness.

MEIER GEO. HILPERT.

Witness:
EMORY S. GROFF.